United States Patent [19]

Ozawa

[11] Patent Number: 4,549,223
[45] Date of Patent: Oct. 22, 1985

[54] READING, PRINTING AND COPYING DEVICE

[75] Inventor: Takashi Ozawa, Kanagawa, Japan

[73] Assignee: Fuji Xerox Co., Ltd., Tokyo, Japan

[21] Appl. No.: 548,490

[22] Filed: Nov. 3, 1983

[30] Foreign Application Priority Data

Nov. 4, 1982 [JP] Japan ................... 57-193628

[51] Int. Cl.⁴ ................................................ H04N 1/30
[52] U.S. Cl. ..................................... 358/300; 350/332; 358/294
[58] Field of Search ................... 346/764, 107 R, 155, 346/160; 350/330, 331 R, 332, 346; 358/296, 300, 302, 294

[56] References Cited

U.S. PATENT DOCUMENTS 4,356,347 10/1982 Wiener ............................ 358/296 X
4,386,836 6/1983 Aoki et al. ....................... 350/346 X Primary Examiner—Thomas H. Tarcza
Attorney, Agent, or Firm—Sughrue, Mion, Zinn, Macpeak & Seas

[57] ABSTRACT

A reading, printing and copying device in which a film image sensor, liquid crystal shutter and drive unit are all fabricated upon a single transparent substrate. The film image sensor includes a plurality of individual photosensing elements, each of which is connected to a transparent electrode covered by a liquid crystal layer in the liquid crystal shutter. The drive unit of the device first couples each of the film image sensing units to a charging potential, after which the incident light determines the final potential of each of the electrodes, and hence the transmissivity of the portion of the liquid crystal layer associated with the transparent electrode coupled to the respective photoconductive element. The outputs of the photoconductive elements are also switchably couplable to an output terminal to provide a serial output signal. Light is shone onto the liquid crystal shutter. The amount of light transmitted through the liquid crystal shutter is controlled by the amount of light reflected from an original to be copied falling upon the film image sensor. The light transmitted through the liquid crystal shutter is applied to a photosensitive copying device.

11 Claims, 6 Drawing Figures

READING, PRINTING AND COPYING DEVICE

BACKGROUND OF THE INVENTION

The present invention relates to a reading, printing and copying device having a small size and lower power consumption.

In some conventional reading devices, as an original document is scanned by a reducing optical system, a CCD image sensor or MOS image sensor outputs a serial original scanning signal. This signal is stored in a buffer memory and then outputted as a parallel signal.

Further, a printing device is known in the art in which parallel print signals are applied to a thermal head having a plurality of heat generating elements or an electrostatic head having a plurality of recording electrodes, and the original is reproduced from the print signal by operation of the head. In such a conventional reading device sufficient space must be provided to accommodate the reducing optical system. Accordingly, the degree of miniaturization of the reading device is limited. Moreover, in the conventional printing device, power is unavoidably consumed by the printing head, and reduction of the number of heat generating elements or recording electrodes is limited. Hence, the amount of possible reduction of the power consumption and degree of miniaturization of the device are limited. If a conventional reading device and conventional printing device are combined to form a single reading/printing device, reduction of the size and the power consumption cannot therefore be expected.

SUMMARY OF THE INVENTION

Overcoming the drawbacks of the prior art, the invention provides a reading, printing and copying device fabricated upon a single substrate and having liquid crystal shutters for transmitting a copying light beam controlled in response to binary potentials of image sensors or binary levels of print signals according to the contents of an original. The binary potentials are delivered to output lines after being processed, for instance, as transmitting signals, whereby the conventional buffer memory is eliminated from the device.

BRIEF DESCRIPTION OF THE DRAWINGS

FIGS. 1A and 1B show a preferred embodiment of a reading, printing and copying device for the invention of which FIG. 1A is a plan view and FIG. 1B is a cross-sectional view taken along a line A—A' in FIG. 1A;

DESCRIPTION OF THE PREFERRED EMBODIMENTS

Figure 1A:
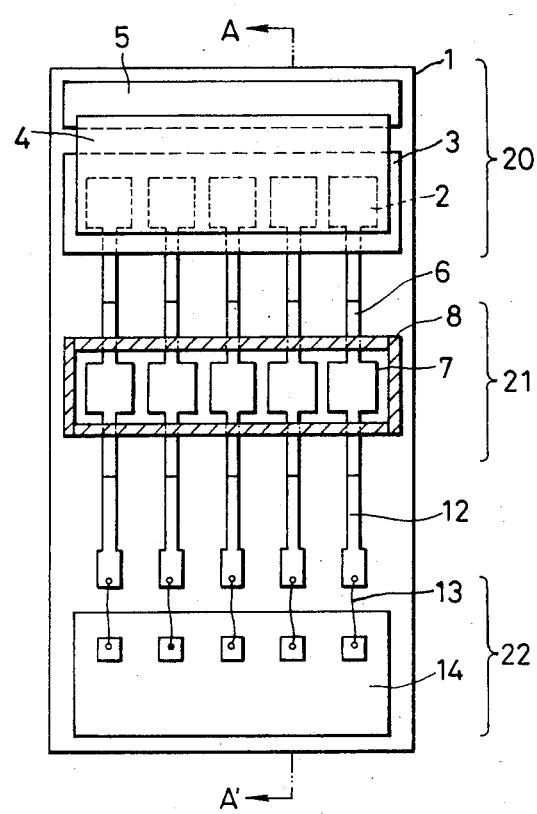
Figure 1B:
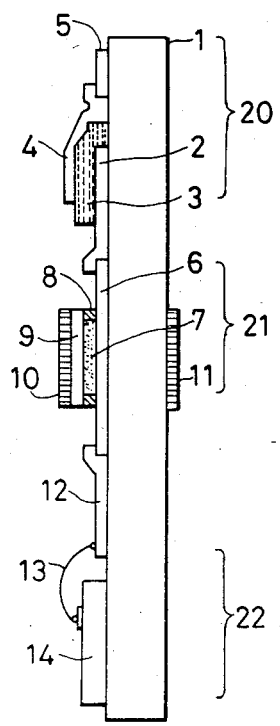

FIGS. 1A and 1B show a preferred embodiment of a reading, printing and copying device of the invention. As shown in FIGS. 1A and 1B, split electrodes made of a metal film of Cr, Al, Ni or Au are formed on a transparent substrate 1 of glass or the like and are covered by a photoconductive layer 3 of semiconductor material such as amorphous Si, Se-As-Te or CdS. A transparent conductive film layer 4 of ITO or SnO$_2$ is formed on the photoconductive layer 3 and is connected to an electrode 5. The split electrodes 2 are connected to transparent conductive film layers 6 which are made of the same material as the transparent conductive film layer 4. A liquid crystal layer 7, surrounded by a sealing member 8 and sealed by a transparent conductive film layer 9, is provided on the transparent conductive film layer 9, is provided on the transparent conductive film layers 6. Polarizing plates 10 and 11 are provided on the surface of the transparent conductive film layer 9 and the rear surface of the substrate 1, respectively. The transparent conductive film layers 6 are connected to electrodes 12 formed on the substrate 1, which, in turn, are connected to a drive circuit 14 through lead wires 13. In the device thus constructed, the part indicated by reference numeral 20 functions as a film image sensor, the part indicated by reference numeral 21 as a liquid crystal shutter, and the part indicated by reference numeral 22 as a drive unit.

Figure 2:
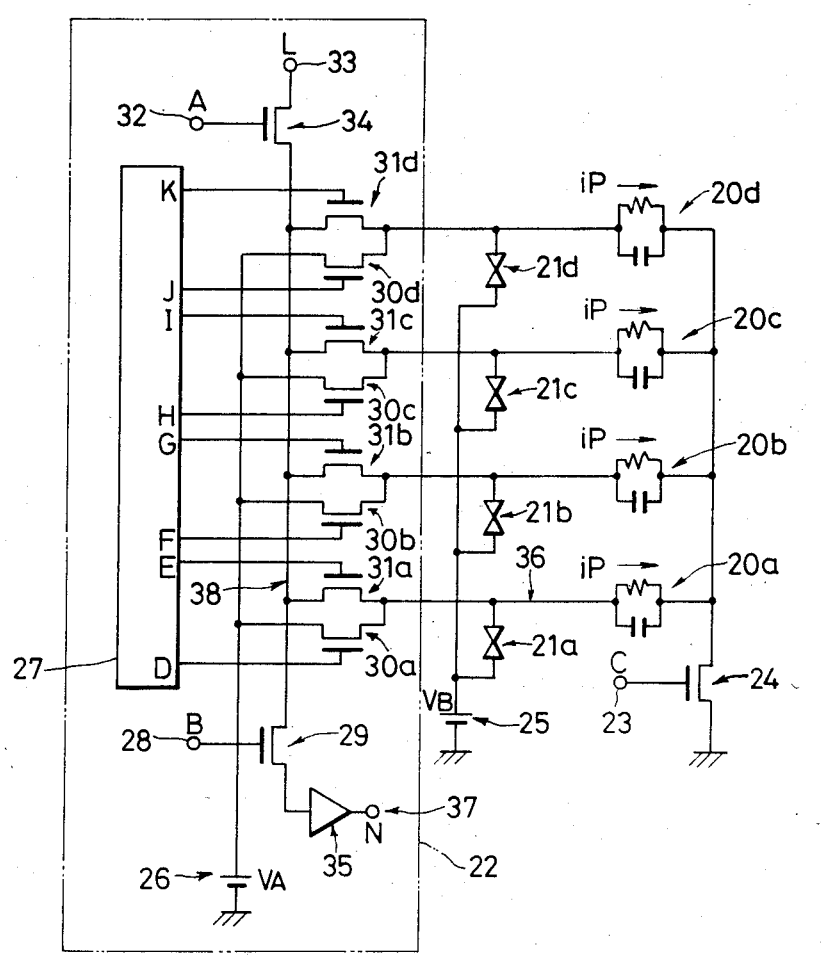
FIG. 2 is a circuit diagram of the device of FIGS. 1A and 1B.

FIG. 2 is a circuit diagram of the device shown in FIGS. 1A and 1B. The device includes: thin film image sensors 20a, 20b, 20c and 20d, each being a parallel circuit of a resistor and a capacitor; liquid crystal shutters 21a, 21b, 21c and 21d having first terminals connected to a bias source 25 of potential $V_B$ and second terminals connected to electrodes 36 (corresponding to the split electrodes 2, the transparent conductive films 6, the electrodes 12 and the lead wires 13); an MOS transistor 24, connected through the electrode 5 to the thin film image sensors 20a, 20b, 20c and 20d, which receives a signal C (the transistor 24 being rendered conductive when the signal C is "1"); MOS transistors 30a, 30b, 30c and 30d whose control terminals are connected to terminals D, F, H and J of a shift register 27, the transistors 30a through 30d applying the bias potential $V_A$ to the electrodes 36 when rendered conductive and MOS transistors 31a, 31b, 31c and 31d whose control terminals are connected to terminals E, G, I and K of the register 27, the transistors 31a through 31d controlling connection to MOS transistors 29 and 34. The MOS transistor 29 receives a control signal B on its gate. When the signal B is "1", the MOS transistor 29 is rendered conductive so that the signal present on the electrode 38, after being amplified by an amplifier 35, is outputted as a signal N on the terminal 37. The MOS transistor 34 receives a control signal A on its gate. When the signal A is "1", the transistor 34 is rendered conductive, whereupon a signal L is applied from the terminal 33 to the electrode 38.

The operation of the device thus constructed will now be described.

Figure 3:
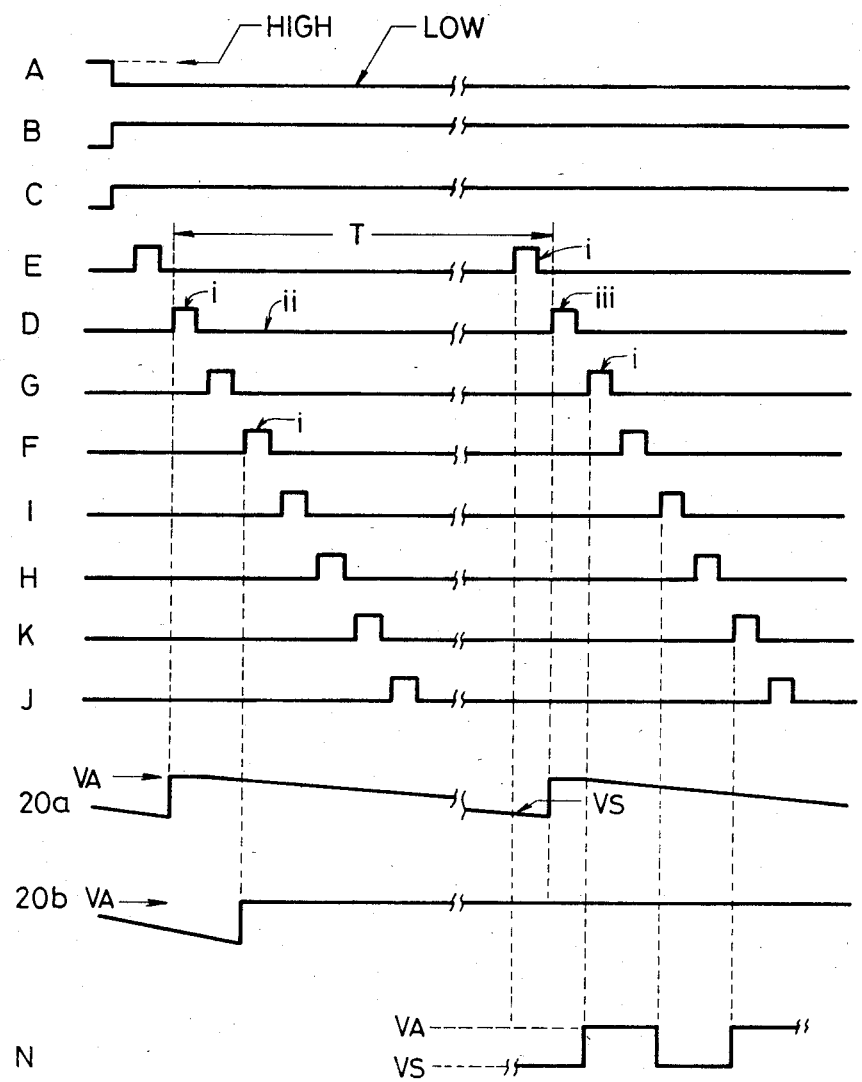
FIGS. 3 and 4 are timing charts used in a description of the operation of the invention.

(1) Operation of converting original image data into electrical signal (FIG. 3)

It is assumed that logic levels of "0", "1" and "1" are applied as the signals A, B and C to the control terminals 32, 28, and 23 of the MOS transistors 34, 29 and 24, respectively. In this case, the MOS transistor 34 is turned off, and the MOS transistors 29 and 24 are turned on. When signals D through K, having a period T, are applied from the shift register 27 to the control terminals of the MOS transistors 30a through 30d and 31a through 31d, first the signal D is "1", (as indicated at i) and the MOS transistor 30a is turned on, as a result of which the capacitance of thin film image sensor 20a is charged to the potential $V_A$ by the bias source 26.

When the signal D is set to "0" (as indicated at ii), the MOS transistor 30a is turned off. When the thin film image sensor 20a is illuminated with the image of an original, the resistance of the photoconductive film 3 is decreased, causing a photocurrent iP to flow in the sensor, decreasing the charging potential $V_A$ towards a potential $V_S$. When the signal E is raised to "1" (as indicated at i), the MOS transistor 31a is turned on. As a result, the potential of the electrode 36, which has been decreased to $V_S$, is provided as the signal N at the terminal 37 through the MOS transistor 29 (which is then conductive) and the amplifier 35. When the signal F is raised to "1", the thin film image sensor 20b is similarly charged to $V_A$. If the sensor 20b is not illuminated by the original, the potential $V_A$ is maintained unchanged. Therefore, when the signal G is raised to "1" (as indicated at i), the potential $V_A$ is outputted, as the signal N, from the terminal 37. As the above-described operation is repeatedly carried out, the signal N is outputted from the terminal 37 in response to the illumination of thin film image sensors 20a through 20d.

Figure 4:
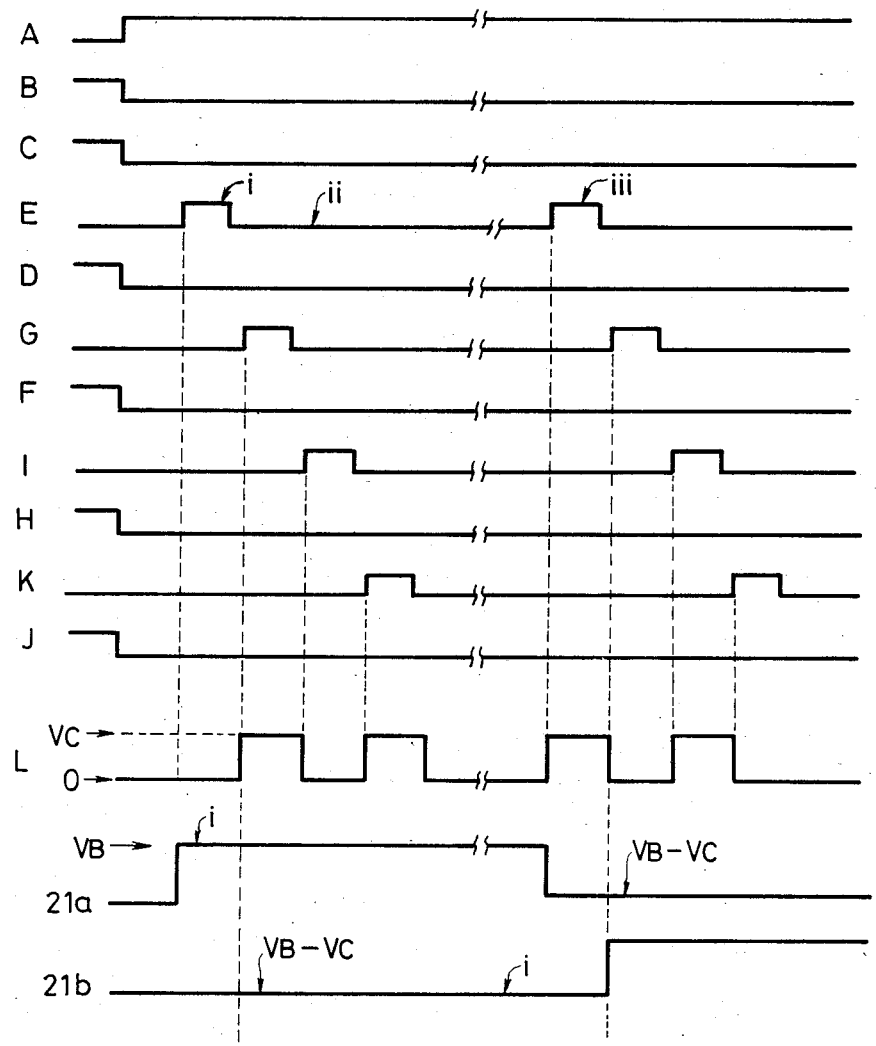

(2) Operation of reproducing an original from electrical signals (FIG. 4)

When logic levels of "1", "0" and "0" are applied as the signals A, B and C to the control terminals 32, 28 and 23 of the MOS transistors 34, 29 and 24, respectively, the MOS transistor 34 is turned on and the MOS transistors 29 and 24 are turned off. Logic levels of "0" are applied as the signals D, F, H and J to the control terminals of the MOS transistors 30a through 30d by the shift register 27 so that the transistors 30a through 30d are rendered nonconductive. When, under these conditions, a picture signal L (in which $V_C$ is the high level and 0 is the low level) is applied through the terminal 33 of the MOS transistor 34 and the signals E, G, I and K, having a timing relationship as shown in FIG. 4 are applied to the control terminals of the MOS transistors 31a through 31d from the terminals E, G, I and K of the shift register 27, the liquid crystal shutter 21a becomes transparent (indicated at i), receiving the potential $V_B$ of the bias source 25. That is, when the signal E is raised to "1", the MOS transistor 31a is rendered conductive (as indicated at i) and thus a "0" is applied, as the picture signal L, to the electrode 36. When the signal E is set to "0" (as indicated at ii), the MOS transistor 31a is rendered nonconductive, and the above-described state is maintained unchanged. When a signal G of "1" is applied to the control terminal of the MOS transistor 31b, the transistor 31b is rendered conductive. Therefore, the liquid crystal shutter 21b receives the high level $V_C$ as the picture signal L from the electrode 36, and accordingly the potential difference across the shutter 21b becomes $V_B - V_C \cong 0$. (as indicated at i). When the signal E is raised to "1" again (as indicated at iii), the picture signal L is at the high level $V_C$, and a voltage $V_B - V_C$ is applied across the liquid crystal shutter 21a. As a result, the liquid crystal shutter 21a becomes opaque. The liquid crystal shutters 21c and 21d can be made transparent and opaque according to the picture signal L by activating the signals I and K, respectively.

(3) Operation of copying an original

A "0" is applied as the signal A to the control terminal 32 of the MOS transistor 34, a "0" is applied as the signal B to the control terminal 28 of the MOS transistor 29, and a "1" is applied as the signal C to the control terminal 23 of the MOS transistor 24, so that the MOS transistors 29 and 34 are turned off while the MOS transistor 24 is turned on. The other operations are the same as those which have been described with reference to the timing chart of FIG. 3. That is, when the film image sensors 20a, 20b, 20c and 20d are illuminated, the voltage $V_B$ is applied to the respective liquid crystal shutters 21a, 21b, 21c and 21d, and when the film image sensors are not illuminated, the voltage $V_A$ is applied to the liquid crystal shutters. Accordingly, when the film image sensors 20a, 20b, 20c and 20d are illuminated, the respective liquid crystal shutters 21a, 21b, 21c and 21d will be transparent, and when the film image sensors are not illuminated, the liquid crystal shutters will be opaque.

Figure 5:
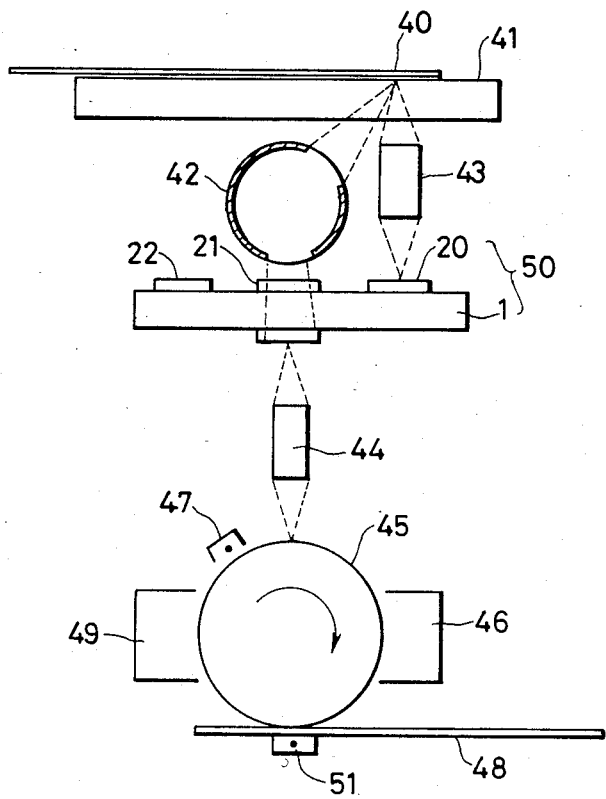
FIG. 5 is an explanatory diagram showing an example of an application of a reading, printing and copying device of the invention.

FIG. 5 illustrates an application of the device according to the invention. A platen 41 on which an original 40 is placed is provided above a reading, printing and copying member 50 constructed as described above, and a photosensitive drum 45 is provided below the member 50. A light source 42 for illuminating the original 40 and the liquid crystal shutter section 21 and an optical fiber unit 43 (which may be replaced by a lens array) for introducing a scanning light beam reflected from the original to the thin film image sensor section 20 are provided between the member 50 and the platen 41. An optical fiber unit 44 (which may be replaced by a lens array) for transmitting the light beam of the light source 42 from the liquid crystal shutter section 21 to the photosensitive drum 45 is provided between the member 50 and the photosensitive drum 45. A charging corotron 47, a developing unit 46, a transferring unit 51 for transferring an image onto a recording sheet 48, and a cleaning unit 49 are disposed around the photosensitive drum 45.

In the device thus constructed, the original 40 on the platen 41 is scanned by being moved, and the light beam reflected from the original is applied through the optical fiber unit 43 to the thin film image sensor section 20, to which a predetermined potential has been applied. The thin film image sensor section 20 holds or releases the potential according to the content of the original 40. The liquid crystal shutter section 21 allows or prevents the transmission of a copying light liquid beam from the light source accordingly. The copying light beam which has passed through the liquid crystal shutter section 21 is transmitted through the optical fiber 44 to the exposure surface of the photosensitive drum 45. Thereafter, the drum 45, which has been charged by the charging corotron 47, is subjected to development by the developing unit 46 to develop the image formed thereon, and the developed image is transferred onto the recording sheet 48 in the transferring section 51. Then, the photosensitive drum 45 is cleaned by the cleaning unit 49.

As is clear from the above description, in the reading, printing and copying device of the invention, the liquid crystal shutters for transmitting the copying light beam are controlled on the basis of the binary potentials of the image sensors or the binary levels of the print signals according to the content of the original, and the binary potentials are delivered to the output lines after being processed, for instance, as transmitting signals. Thereby, the conventionally required buffer memory means is eliminated. Thus, the device of the invention is not only smaller in size but also has a lower power consumption than the prior art device.

I claim:

1. A reading, printing and copying device, comprising:

light sensing means for sensing the intensity of an incident light signal, said light sensing means including photoconductive material;

liquid crystal shutter means having a transmissivity to light controlled by said light sensing means, said liquid crystal shutter means including a first electrode directly connected to said photoconductive material, said light sensing means and said liquid crystal shutter means being fabricated upon a single substrate;

means for applying a first potential to said light sensing means, said light sensing means selectively transmitting said first potential to said liquid crystal shutter means through said directly-connected photoconductive material and first electrode in accordance with said incident light signal intensity; and photosensitive copying means positioned to receive light transmitted through said liquid crystal shutter means.

2. The reading, printing and copying device of claim 1, wherein said light sensing means comprises an array of image sensing elements, and wherein said liquid crystal shutter means comprises a number of liquid crystal shutters equal in number to the number of said image sensing elements, each of said liquid crystal shutters being associated with a respective one of said image sensing elements.

3. The reading, printing and copying device of claim 1, further comprising a first optical system for directing light from an original onto said light sensing means, and a second optical system for directing light passing through said liquid crystal shutter means to said photosensitive copying means.

4. The reading, printing and copying device of claim 1, wherein said photosensitive copying means comprises a photosensitive drum.

5. The reading, printing and copying device of claim 1, further comprising switching means for switchably coupling an output of said light sensing means to an output terminal as an original scanning signal.

6. The reading, printing and copying device of claim 3, further comprising first semiconductor switch means for applying a charging potential to said light sensing means, second semiconductor switching means for switchably coupling said light sensing means to said liquid crystal shutter means, and control means for operating said first and second semiconductor switch means in sequence.

7. The reading, printing and copying device of claim 6, wherein said first and second semiconductor switch means each comprise FET transistors, and wherein said control means comprises a shift register having outputs coupled to gates of respective ones of said FET transistors.

8. A reading, printing and copying device comprising:
a transparent substrate;
an image sensor fabricated upon a first portion of said transparent substrate, said image sensor comprising a split electrode having a plurality of electrode portions formed on one surface of said transparent substrate, a layer of photoconductive material disposed over said split electrode, a first transparent conductive film layer disposed over said layer of photoconductive material, and an electrode coupled to said first transparent conductive film;

a liquid crystal shutter formed on a second portion of said transparent substrate, said liquid crystal shutter comprising a plurality of regions of a second transparent conductive film layer, each of said regions being coupled to a respective electrode portion of said split electrode;

a liquid crystal layer disposed over said second transparent conductive film layer;

a third transparent conductive film layer formed over said liquid crystal layer;

first and second polarizing plates, said first polarizing plate being disposed over said third transparent conductive film layer and said second polarizing plate being disposed on the opposite surface of said transparent substrate opposite said first polarizing plate; and a drive unit fabricated upon a third portion of said transparent substrate.

9. The reading, printing and copying device of claim 7, wherein said drive unit comprises first and second sets of semiconductor switches, said first set of semiconductor switches being connected to switchably couple respective ones of said electrode regions of said split electrode to a charging potential source, and said second set of semiconductor switches being connected to switchably couple respective ones of said regions of said split electrode to an output terminal.

10. A reading, printing and copying device, comprising:
a platen for holding an original document;
a transparent substrate;
a light source disposed between said platen and said substrate;
photosensitive copying means disposed on the side of said substrate opposite said light source;
liquid crystal shutter means, fabricated on said substrate and responsive to control signals for selectively passing light from said light source to said photosensitive copying means; and
image sensing means, fabricated on said substrate and responsive to light from said light source reflected from the original document for providing said control signals to said liquid crystal shutter means.

11. A reading, printing, and copying device as claimed in claim 8, further comprising:
a platen for holding an original document to be copied;
a light source disposed between said platen and said transparent substrate; and
photosensitive copying means disposed on the side of said transparent substrate opposite said light source, said liquid crystal shutter being responsive to control signals for selectively passing light from said light source to said photosensitive copying means, said image sensor being responsive to light from said light source reflected from the original document for providing said control signals to said liquid crystal shutter.

* * * * *